United States Patent
Eberspäch et al.

(10) Patent No.: US 7,216,812 B2
(45) Date of Patent: May 15, 2007

(54) DEVICE FOR AIR CONDITIONING A VEHICLE

(75) Inventors: Günter Eberspäch, Wolfschlugen (DE); Bruno Lindl, Pfinztal (DE); Andreas Kaupert, Ulm (DE); Gerd Gaiser, Reutlingen (DE); Walter Blaschke, Deizisau (DE)

(73) Assignee: J. Eberspächer GmbH & Co. KG, Esslingen (DE)

( * ) Notice: Subject to any disclaimer, the term of this patent is extended or adjusted under 35 U.S.C. 154(b) by 0 days.

(21) Appl. No.: 10/759,754

(22) Filed: Jan. 16, 2004

(65) Prior Publication Data

US 2004/0195345 A1    Oct. 7, 2004

(30) Foreign Application Priority Data

Jan. 17, 2003    (DE)    ................. 103 01 667

(51) Int. Cl.
*B60H 1/02*    (2006.01)
(52) U.S. Cl. ............... 237/12.3 R; 237/12.3 B; 165/41; 165/42
(58) Field of Classification Search .......... 237/12.3 B, 237/12.3 R; 123/142.5 E; 165/41, 42
See application file for complete search history.

(56) References Cited

U.S. PATENT DOCUMENTS

| | | | | |
|---|---|---|---|---|
| 3,775,186 A | * | 11/1973 | Cheron | ............ 429/20 |
| 5,058,391 A | * | 10/1991 | Periot | ............ 62/238.6 |
| 5,248,566 A | * | 9/1993 | Kumar et al. | ............ 429/19 |
| 5,409,784 A | * | 4/1995 | Bromberg et al. | ............ 429/13 |
| 5,537,956 A | * | 7/1996 | Rennfeld et al. | ............ 123/41.29 |
| 6,053,266 A | * | 4/2000 | Greenhill et al. | ............ 180/65.3 |
| 6,186,254 B1 | * | 2/2001 | Mufford et al. | ............ 180/65.3 |
| 6,210,821 B1 | * | 4/2001 | Lesieur et al. | ............ 429/17 |
| 6,448,535 B1 | * | 9/2002 | Ap | ............ 219/208 |
| 6,588,522 B2 | * | 7/2003 | Baumert et al. | ............ 180/65.1 |
| 6,651,761 B1 | * | 11/2003 | Hrovat et al. | ............ 180/65.3 |
| 6,715,571 B2 | * | 4/2004 | Nakamori | ............ 180/65.1 |
| 6,732,942 B1 | * | 5/2004 | Sangwan et al. | ............ 237/12.3 B |

FOREIGN PATENT DOCUMENTS

| | | |
|---|---|---|
| DE | 100 62 257 A1 | 7/2001 |
| DE | 199 13 795 C1 | 10/2001 |
| DE | 101 39 617 A1 | 7/2002 |
| EP | 0 999 078 A1 | 5/2000 |
| EP | 1 057 668 A | 6/2000 |
| EP | 1 234 697 A1 | 8/2002 |
| EP | 1 241 723 A | 9/2002 |

OTHER PUBLICATIONS

Examination Report from German Patent Office for German Priority Application 103 01 667.8 dated Jan. 17, 2003.

* cited by examiner

*Primary Examiner*—Derek S. Boles

(57) ABSTRACT

A device for conditioning a vehicle includes at least one electrically operated conditioning arrangement, a hot air supply system with a heat source, and a delivery arrangement for delivery of heated air into a vehicle interior, a fuel cell system for providing electrical energy for the at least one conditioning arrangement and the delivery arrangement. The hot air supply system includes the fuel cell system as heat source and also furthermore a heat exchanger arrangement for transferring heat arising in the region of the fuel cell system to the air to be delivered into the vehicle interior.

6 Claims, 2 Drawing Sheets

DEVICE FOR AIR CONDITIONING A VEHICLE

CROSS-REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to a device for air conditioning a vehicle.

TECHNICAL FIELD

Modem motor vehicles are increasingly equipped with systems which act, for example, to air condition the vehicle before travel, i.e. to bring the vehicle into a state desired by an occupant, for example, to heat the vehicle or to prepare in advance various system regions, so that, for example, an internal combustion engine acting as drive assembly, on starting, even in the starting phase, has as low as possible emission of pollutants.

It is known to use as stationary heating devices, fuel-operated heating devices for air-conditioning vehicles, and likewise electrically operated systems such as seat heating and the like. The electrically operated systems very strongly load the batteries generally provided in a motor vehicle, particularly at comparatively low temperatures, so that there is an increasing effort to integrate fuel cells into a vehicle in order in this manner to sufficiently supply these users even in a state in which a drive assembly cannot yet be used for the production of electrical energy, or in a state in which even when a drive assembly is operating, this can contribute only relatively poorly to obtaining electric energy.

SUMMARY OF THE INVENTION

The object of the present invention is to more efficiently use the system components provided in a vehicle and contributing to its air conditioning.

According to a first embodiment of the present invention, this object is attained by a device for conditioning a vehicle, including at least one electrically operated conditioning arrangement, a heated air supply system with a heat source, and a delivery arrangement for delivering heated air into a vehicle interior; the fuel cell system for preparing electric energy for the at least one conditioning arrangement and/or the delivery arrangement; the heated air supply system including the fuel cell system as a heat source, and furthermore a heat exchanger arrangement for transferring heat arising in the region of the fuel cell system to the air to be delivered to the vehicle interior.

It is important in this embodiment of the invention that a fuel cell system acting for providing sufficient electrical energy simultaneously also represents this source of the heat energy which is required in order to be able to feed heated air into the vehicle interior, such as a passenger compartment or possibly even a load compartment. The provision of an additional fuel-operated heating device as is generally usual in the prior art is then not required.

For example, it can be provided that the conditioning device comprises: a stationary heating device and/or a windshield heating device and/or external mirror heating device and/or steering wheel heating device.

All these devices contribute, on the one hand, to increase comfort, and how-ever also on the other hand to increase safety, in that even at comparatively low external temperatures all windscreens and possibly also external mirrors are thawed.

Furthermore it can be provided that the fuel cell system includes a reforming arrangement for the production of a hydrogen-containing reformation product, and that heat arising in the region of the reformer arrangement and/or in the region of the fuel cell can be transferred to the air to be delivered to the vehicle interior by means of the heat exchanger arrangement. Since also the fuel cell system itself includes various regions in which heat arises during operation of the system, a most extreme utilization of the energy arising as waste heat is made possible. Particularly when the fuel cell is constructed as a so-called PEM fuel cell, it is advantageous or required to pre-purify the hydrogen-containing reformed product leaving the reforming arrangement. It is therefore proposed that the fuel cell system includes a reformed product purifying stage between the reforming arrangement and the fuel cell, and that heat arising due to the heat exchanger arrangement in the region of the reformed product purifying stage can be transferred to the air to be delivered to the vehicle interior. A further contribution to improve utilization of the heat arising in the vehicle is provided in this manner.

Since in practice it is not possible to use all of the hydrogen fed into a fuel cell to obtain electrical energy, the gas mixture leaving the fuel cell contains a certain fraction of residual hydrogen. According to a further embodiment of the present invention it is therefore proposed that the fuel cell system includes a burner for combustion with air of the residual leaving the fuel cell, and that the heat arising in the region of the burner can be transferred by the heat exchanger arrangement to the air to be delivered to the vehicle interior. It is possible in this manner to provide a further heat energy contribution that can then be used for heating other system components.

According to a further embodiment of the present invention the above-mentioned object is attained by a device for conditioning a vehicle including a fuel cell system for providing electrical energy and also the heat exchanger arrangement for transferring heat arising in the region of the fuel cell system to at least one system region of the vehicle to be heated.

It can be seen that the conditioning of the vehicle includes not only an increase of comfort or safety, but also the preparation or pre-heating various operating systems of the vehicle, such as e.g., an exhaust gas after-treatment system or a drive assembly. In this manner, the exhaust heat arising in the fuel cell system can ensure, by corresponding pre-heating or conditioning of these system regions, that, for example, the drive assembly emits less pollutants on starting due to the pre-heating which has already taken place, and that with corresponding pre-heating of the exhaust gas after-treatment system this is also already capable, in the starting phase, of decomposing with very high efficiency pollutants emitted by the drive assembly.

It is evident that the second conditioning embodiment of the present invention can be combined with the first-mentioned embodiment, and that of course the embodiment possibilities can also be provided with the second-mentioned conditioning embodiment, particularly in the field of fuel cell systems.

BRIEF DESCRIPTION OF THE DRAWINGS

The present invention is described in detail hereinafter with reference to the accompanying drawings.

DETAILED DESCRIPTION OF THE INVENTION

Figure 1:
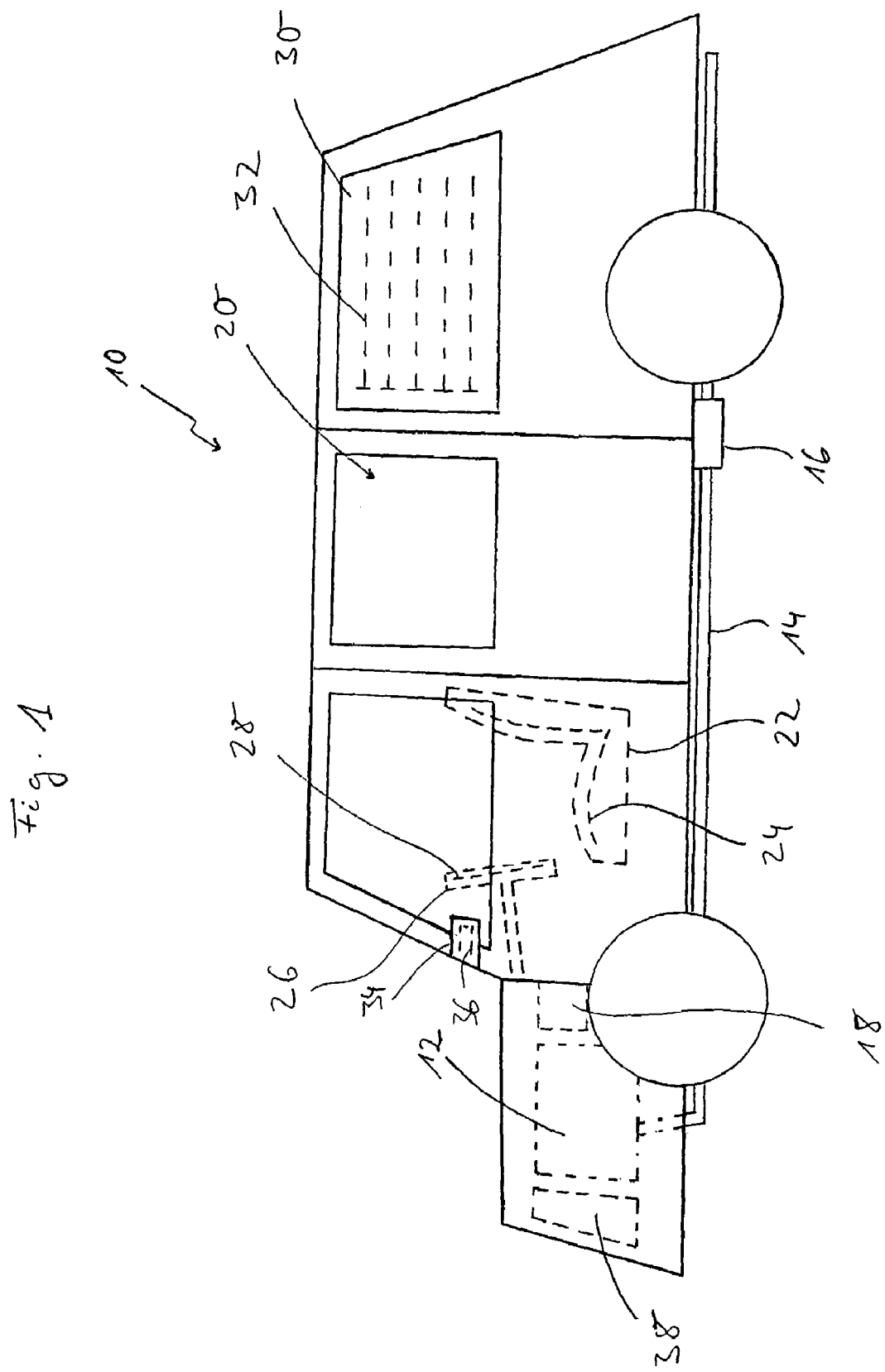
FIG. 1 shows a principle view of a motor vehicle.

A motor vehicle 10 is shown in FIG. 1 and can be conditioned according to the principle of the present invention.

The motor vehicle 10 has an internal combustion engine 12 as drive assembly. The exhaust gases produced in the internal combustion engine 12 are discharged externally via an exhaust gas conducting system 14 and an exhaust gas after-treatment system 16. Furthermore, a fan 18 is provided that can introduce air into the interior of the motor vehicle. This air can be pre-heated, as described below, which can take place in normal travel using, for example, the heat produced by the internal combustion engine 12. Plural seats 22 are provided in the interior 20 of the motor vehicle 10, only the driver's seat being shown by way of example. The driver's seat 22 has an electrically operated seat heating 24, as may other seats. Furthermore, a steering wheel 26 is provided to which a likewise electrically operable steering wheel heating 18 is allocated.

Various window-panes 30 of the motor vehicle 10 can be equipped with an electrically operable window heating 32, preferably at least the rear window and the windshield being provided with such heating. Also the external mirror(s) 34 can be provided with electrically operable mirror heating 36.

In order to be able to ensure in all operating states that sufficient electrical energy can be made available for all electrically operable systems of the motor vehicle 10, the motor vehicle 10 has a fuel cell system 38, shown only schematically, which is explained in more detail hereinafter with reference to FIGS. 2 and 3. This fuel cell system ensures that, particularly in operating states in which the internal combustion engine 12 cannot be used, or additionally used, for the production of electrical energy, sufficient electrical energy is present. It is thus possible to thermally prepare the motor vehicle 10 before travel and even before setting the internal combustion engine 12 in operation, thus, for example, by exciting the various previously described electrically operable heating systems 24, 28, 32, 36 and possibly also an electrical heating of the exhaust gas after-treatment system 16, to bring the vehicle into a state in which from the beginning of travel, particularly at comparatively low external temperatures, there is a pleasant environment for the traveler; on the other hand, however, different operable systems can already be in an operating state in which they can work about optimally. The fan 18 can also be operated by means of the on-board system and thus with electrical energy supplied by the fuel cell system 38.

According to the principles of the present inventions, however, not only is the electrical energy supplied by the fuel cell system 38 used, but also the heat arising when producing electrical energy in the fuel cell system 38. This heat can be transferred to the air to be introduced into the vehicle interior 20, using various heat exchangers, and then conducted by the fan 18 into the vehicle interior 20. Thus the energy provided particularly in the region of the fuel cell system, and thus not only the electrical energy but also the heat energy, can be used in an optimal manner to prepare or additionally heat the vehicle 10. Here, the heat arising in the fuel cell system 38 when producing electrical energy is not only used to heat the vehicle interior 20, but can also, for example, also be used for pre-heating the internal combustion engine and the exhaust gas conduction system 14, particularly the exhaust gas after-treatment system 16. Thus, particularly, at the beginning of operation of the internal combustion engine, at comparatively low external temperatures, its pollutant emission can be reduced. The fuel cell system can, however, be used not only in the stationary state and at comparatively low external temperatures, but also, as regards the heat produced there, for example, when the internal combustion engine 12 is a diesel assembly, can be operated as a so-called auxiliary heater, which is also active during travel operation.

Figure 2:
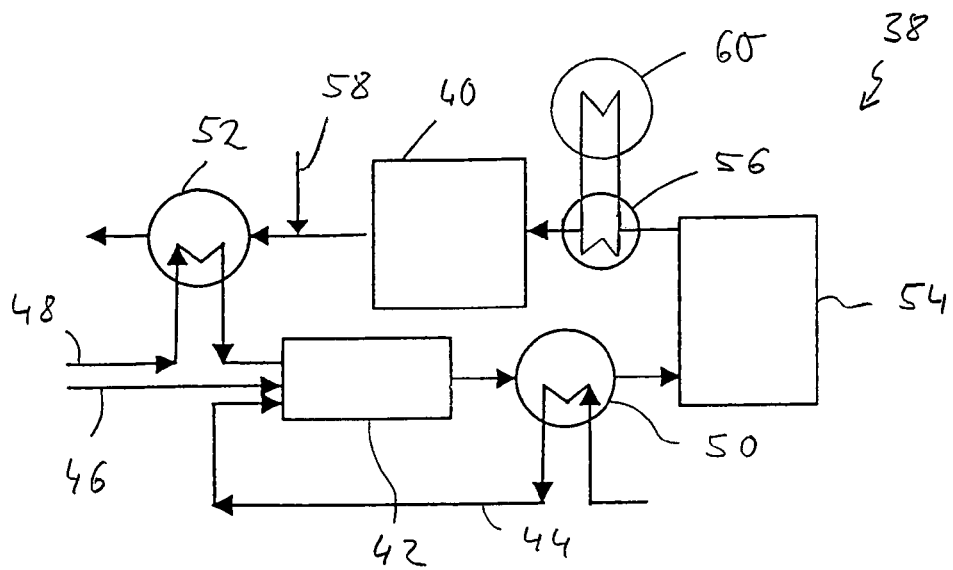
FIG. 2 is a block diagram of a PEM type fuel cell.
Figure 3:
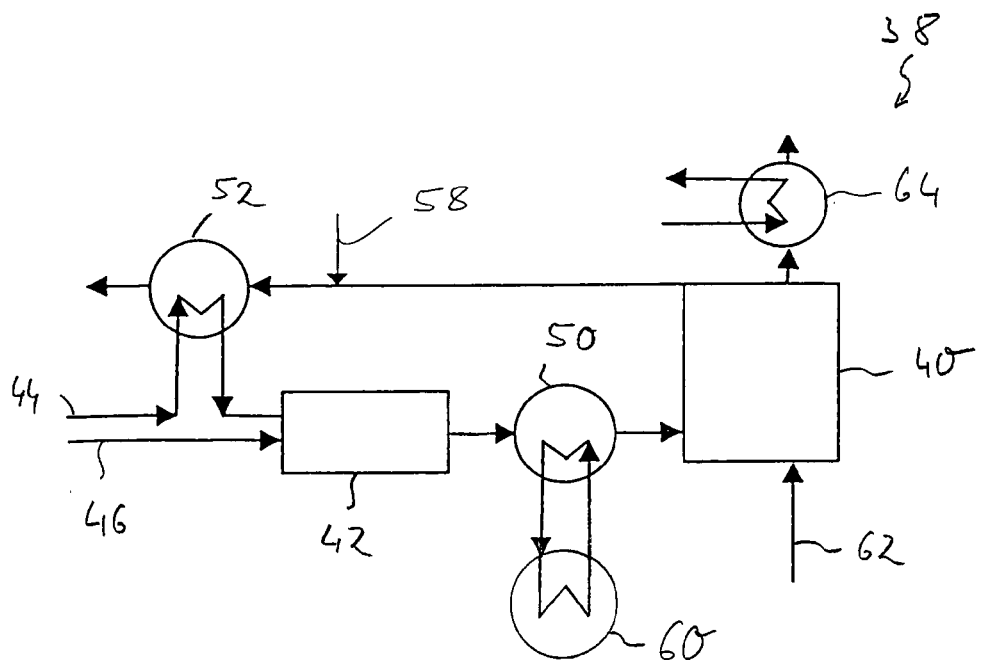
FIG. 3 is a diagram corresponding to FIG. 2 of a fuel cell system of the SOFC type.

Examples of fuel cell systems that can be used in the motor vehicle shown in FIG. 1 are shown in FIGS. 2 and 3. The fuel cell system shown in FIG. 2 is of the so-called PEM type, in which a fuel cell 40 of this fuel cell system 38 operates at the comparatively low temperature in the region of 80° C. The fuel cell system 38 includes, besides the fuel cell 40, a reformer 42 into which air 44, fuel 46 and water 48 are fed. The air 44 and the water 48 can be preheated in heat exchangers 50, 52, so that they evaporate more quickly on introduction into the reformer 42 in common with the fuel 44 and are converted into a hydrogen-containing reformation product. This hydrogen-containing reformation product leaves the reformer 42 and is cooled in the heat exchanger 50, transferring its heat, or a portion of its heat, to the air 44. This reformation product flows after the heat exchanger 50 into a gas purification step 54, which likewise operates at very high temperature. The hydrogen-containing gas leaving the gas purification stage flows through a further heat exchanger 56 before it enters the fuel cell 40 at a suitable temperature. The hydrogen of the hydrogen-containing gas leaving the gas purification stage 54 reacts with oxygen of the air and thus produces electrical energy. The gas leaving the fuel cell 40 always still contains a further residual fraction of hydrogen, which is combusted with further air 58. The heat produced in this combustion is at least partially transferred in the heat exchanger 52 to the water being introduced into the reformer 42.

The heat withdrawn from the hydrogen-containing gas in the heat exchanger 56 can, for example, be particularly transferred in a further heat exchanger 60 to the air to be delivered to the vehicle interior 20 by the action of the fan 18.

Furthermore, heat arising in the fuel cell system 38 can be transferred in the heat exchanger 60 or a further heat exchanger to the coolant of the internal combustion engine 12, so this can already be preheated. Furthermore, it is possible to pass the gas leaving the heat exchanger 52 through the internal combustion engine and the exhaust gas conduction system 14, to preheat these system components. It is, of course, also possible to use the two heat exchangers 50, 52 to transfer heat to other media, for example, to air to be delivered to the vehicle interior.

In fuel cell system 38 shown in FIG. 3 a SOFC-type system is concerned. The fuel cell operates at a temperature of 650° C. or more. Again, fuel 46 and air 44 are supplied to the reformer 42; they can be preheated in the heat exchanger 52. The reformation product leaving the reformer 42 and having a comparatively high temperature passes through the heat exchanger 50 before entering the fuel cell 40. The hydrogen reacts with the air 62, or the oxygen contained therein, with the production of electrical energy. The oxygen-enriched air leaves the fuel cell 40 via a further heat exchanger 64. Furthermore the hydrogen-enriched gas leaves the fuel cell 40 in the direction toward the heat exchanger 52. Before it reaches the heat exchanger 52, however, further air is added and is brought to combustion, together with the residual oxygen still contained in this gas, in order still to be able to use the heat thereby arising in the heat exchanger 52.

It can be seen that is is also possible with fuel cell system 38 of FIG. 3, particularly with the heat exchangers 64, 50 and 52, to transfer the heat withdrawn there from the oxygen-enriched air or from the reformation product to other media, such as the air to be delivered to the vehicle interior or to the cooling medium of the internal combustion engine.

Also in the system shown in FIG. 2 similarly to the system of FIG. 3 the air conducted through the fuel cell 40 and leaving the fuel cell 40 with elevated temperature of, for example, more than 80° C., is conducted through a heat exchanger, as is the case with the heat exchanger 64 of the system of FIG. 3. Also the heat first transported in this air can then be further used in the sense of the present invention.

In order to be able to bring such a fuel cell system also into operation in a state in which, for example, before traveling at low external temperatures, sufficiently high operating temperatures are not present in the region of the fuel cell system, particularly in the region of the reformer, the gas purification stage, and the fuel cell itself, it is for example possible to combust, that is, to ignite, the mixture of combustion air and fuel first produced in the reformer, in the manner of a fuel-operated heating device, so that the very hot exhaust gases leaving the reformer, on passing through the reformer itself and possibly also the gas purification stage and the fuel cell, contribute to the heating of these components.

The two fuel cell systems shown in FIGS. 2 and 3 are only by way of example to illustrate that in different regions of such a fuel cell system, due to the working temperature required in these regions, which may be up to 900° C., heat arises which can be used, according to the principles of the present invention, for conditioning the motor vehicle 10, thus, for example, for introduction of heated air into the vehicle interior, of for preheating or heating various system components. Otherwise embodied fuel cell systems can of course be used here. However, it is elementary in the present invention that the fuel cell systems are not only used for the production of electrical energy, but that also the heat arising is used and is not discharged as waste heat to the surroundings. Here particularly the heating of the exhaust gas after-treatment system 16, plus for example the catalyst or particle filter provided there, is of elementary importance for reduced pollutant emission at the beginning of operation.

Finally it should be mentioned, that in the sense of the present invention the expression "vehicle interior" denotes not only the passenger compartment but also any other vehicle interior, such as a freight space or the like.

We claim:

1. A device for conditioning a motor vehicle, comprising at least one electrically operated conditioning device (24, 28, 32, 36), a hot air supply system with a heat source and a delivery arrangement (18) for delivering heated air into a vehicle interior (20), a fuel cell system (38) for providing electrical energy for the at least one conditioning arrangement (24, 28, 32, 36) or the delivery arrangement (18), wherein the fuel cell system (38) comprises a reformer arrangement (42) for producing a hydrogen-containing reformation product and a fuel cell (40), and comprises a burner for combustion with air of residual hydrogen leaving the fuel cell (40), wherein the hot air supply system includes the fuel cell system (38) as heat source and a heat exchanger arrangement (60) for transferring heat arising in a region of the fuel cell system (38) to air to be delivered into the vehicle interior (20), and wherein heat arising in at least one of a region of the reformer arrangement (42) and in a region of the burner is transferred to the air to be delivered into the vehicle interior (20).

2. The device according to claim 1, wherein the conditioning arrangement (24, 28, 32, 36) comprises at least one of:

a seat heating device (24),
a windscreen heating device (32),
an external mirror heating device (36), and
a steering wheel heating device (28).

3. The device according to claim 1, wherein the fuel cell system (38) comprises a reformation product purification stage (54), and heat arising in a region of the reformed product purification stage (54) is transferred by the heat exchanger arrangement (60) to the air to be delivered to the vehicle interior (20).

4. The device according to claim 1, wherein the heat arising in the region of the fuel cell (40) can be transferred by the heat exchanger arrangement (60) to the air to be delivered to the vehicle interior (20).

5. The device according to claim 1, wherein the heat exchanger arrangement (60) transfers heat arising in the region of the fuel cell system (38) to at least one system region of the vehicle (10) to be heated.

6. The device according to claim 5, wherein the at least one system region to be heated of the vehicle (10) comprises at least one of:

an exhaust gas after-treatment system and
a drive assembly.

* * * * *